Dec. 7, 1954 A. SHORTLAND 2,696,093
MACHINE AND METHOD OF JOINING ROWS OF LOOPS OF KNITTED
FABRIC, AND PARTICULARLY OF CLOSING THE TOES AND HEELS
OF FULL-FASHIONED STOCKING BLANKS
Filed Feb. 6, 1951 8 Sheets-Sheet 1
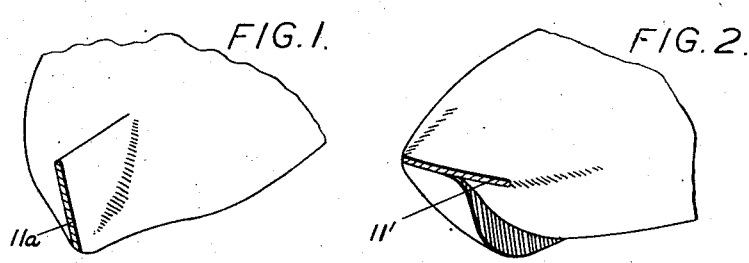
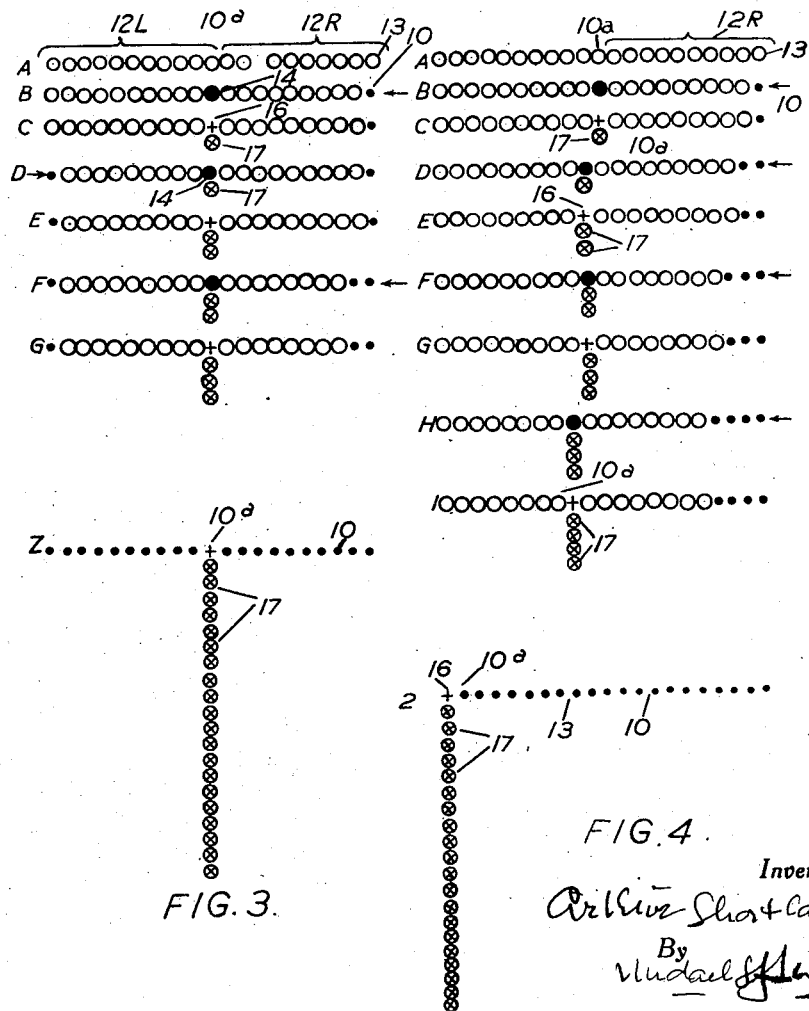

Dec. 7, 1954  A. SHORTLAND  2,696,093
MACHINE AND METHOD OF JOINING ROWS OF LOOPS OF KNITTED
FABRIC, AND PARTICULARLY OF CLOSING THE TOES AND HEELS
OF FULL-FASHIONED STOCKING BLANKS
Filed Feb. 6, 1951  8 Sheets-Sheet 2
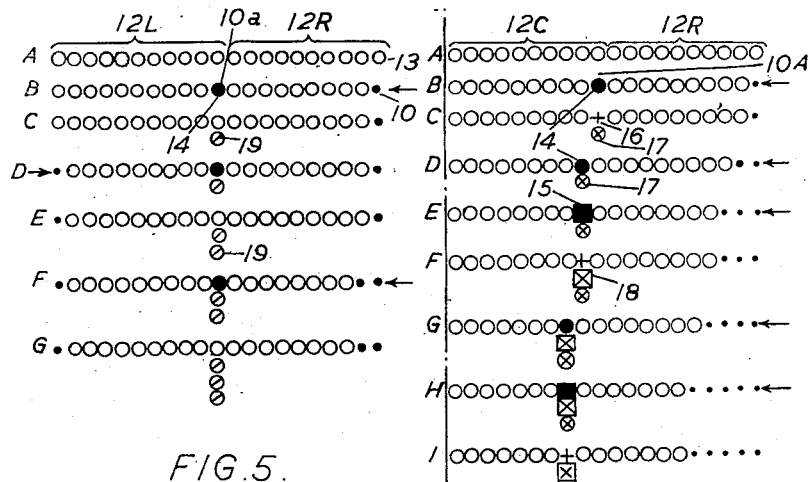
FIG.5.  FIG.6.
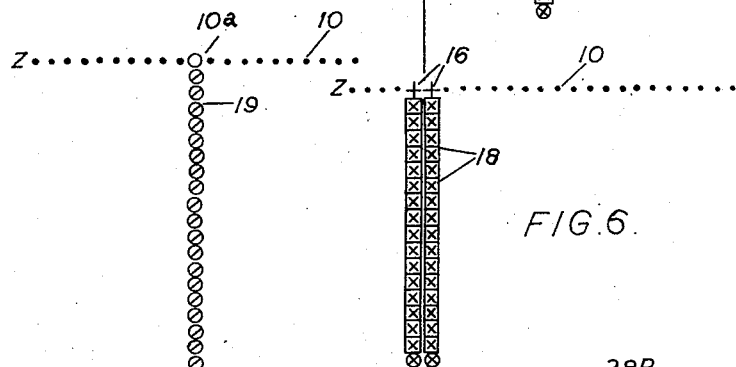
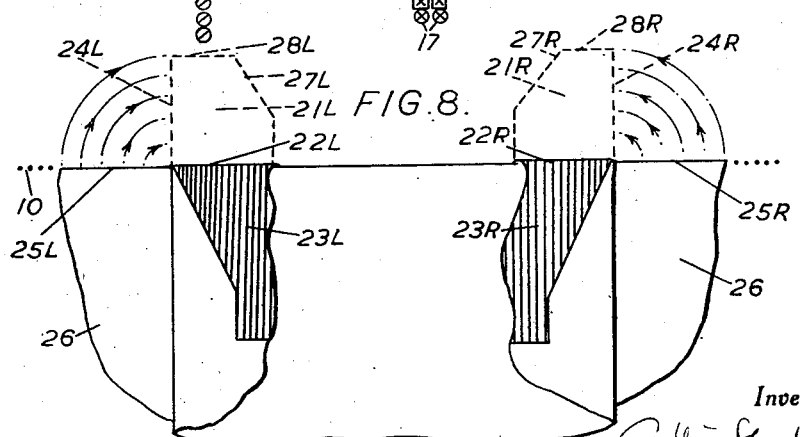
FIG.8.
Inventor
Arthur Shortland
By

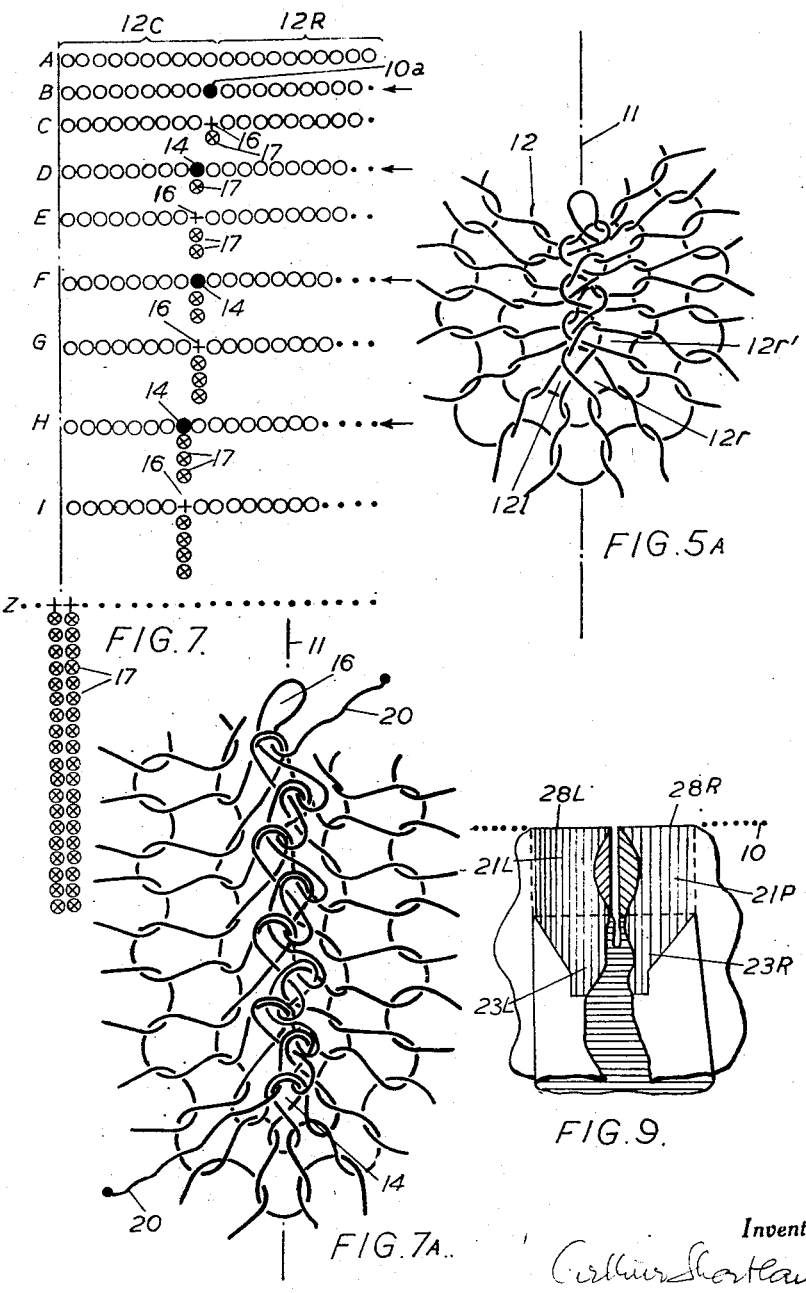

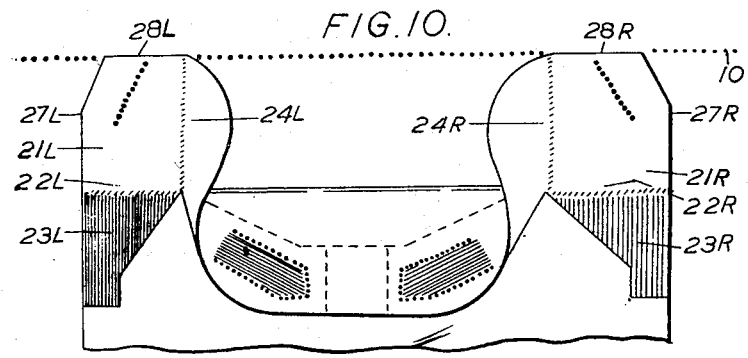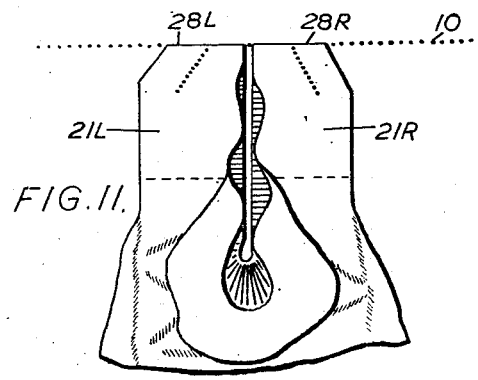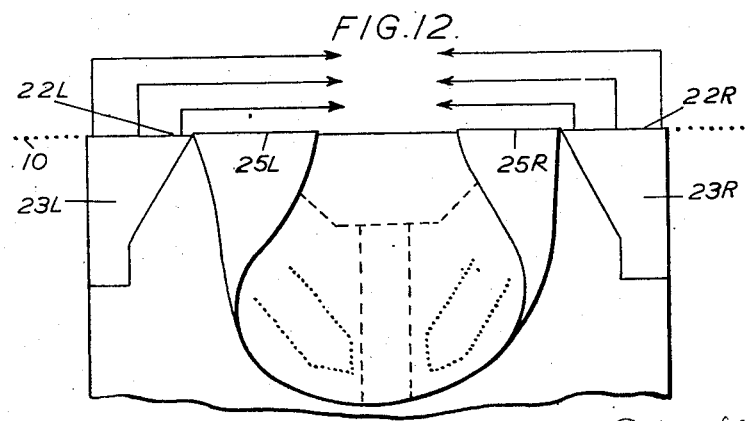

Dec. 7, 1954 A. SHORTLAND 2,696,093
MACHINE AND METHOD OF JOINING ROWS OF LOOPS OF KNITTED
FABRIC, AND PARTICULARLY OF CLOSING THE TOES AND HEELS
OF FULL-FASHIONED STOCKING BLANKS
Filed Feb. 6, 1951 8 Sheets-Sheet 5
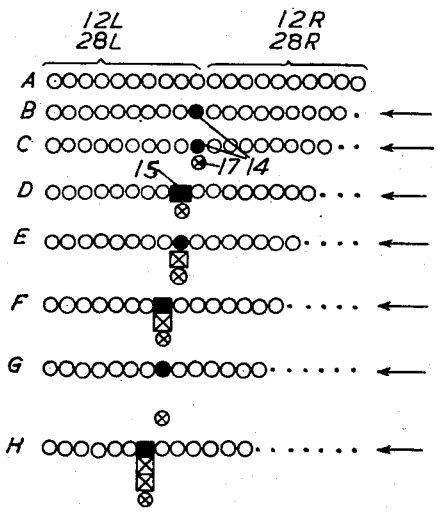
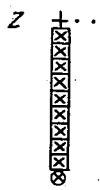
FIG.13.
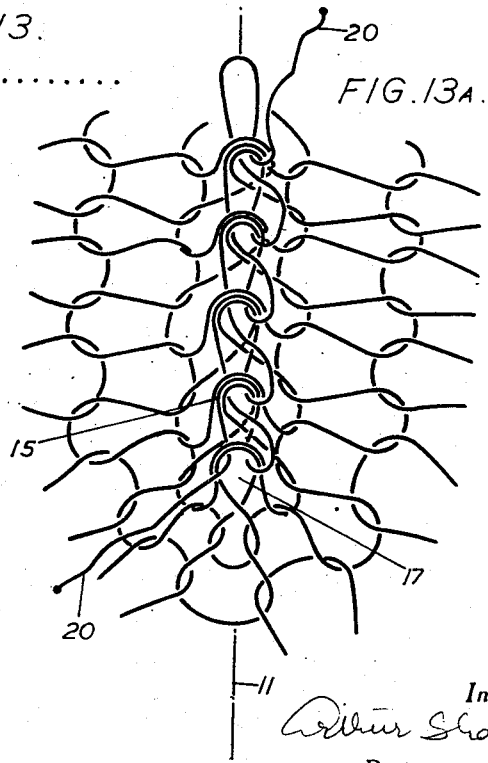
FIG.13A.
Inventor
Arthur Shortland
By Dec. 7, 1954 A. SHORTLAND 2,696,093
MACHINE AND METHOD OF JOINING ROWS OF LOOPS OF KNITTED
FABRIC, AND PARTICULARLY OF CLOSING THE TOES AND HEELS
OF FULL-FASHIONED STOCKING BLANKS
Filed Feb. 6, 1951 8 Sheets-Sheet 6
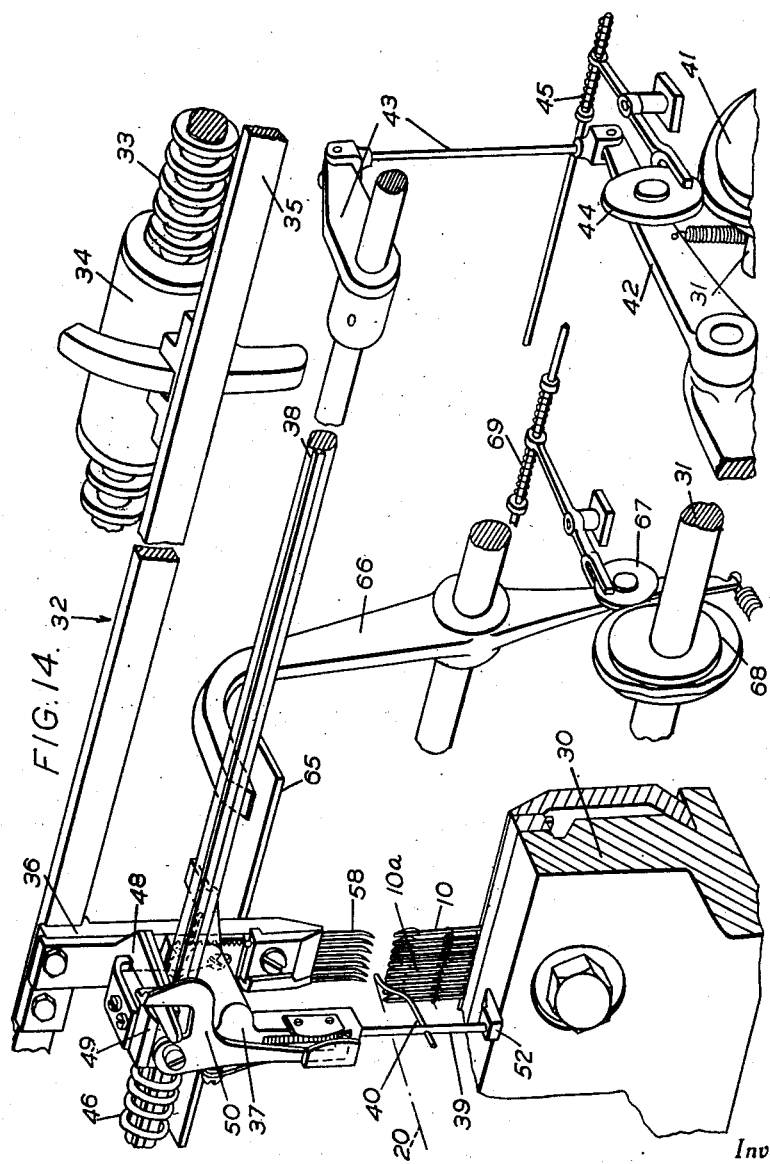
*Inventor*
Arthur Shortland
By
Michael [signature]

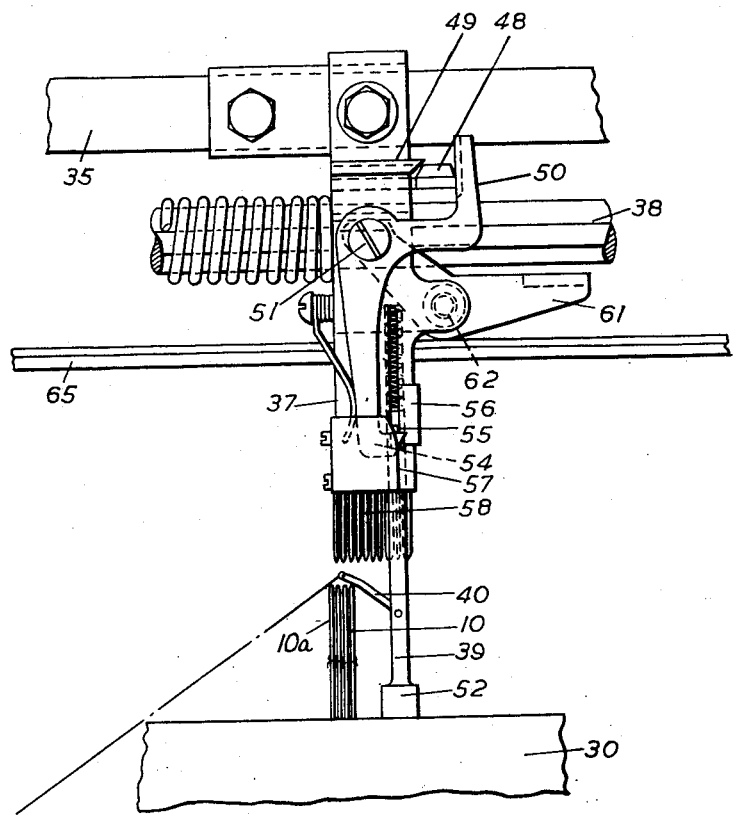

Dec. 7, 1954  A. SHORTLAND  2,696,093
MACHINE AND METHOD OF JOINING ROWS OF LOOPS OF KNITTED
FABRIC, AND PARTICULARLY OF CLOSING THE TOES AND HEELS
OF FULL-FASHIONED STOCKING BLANKS
Filed Feb. 6, 1951  8 Sheets-Sheet 8
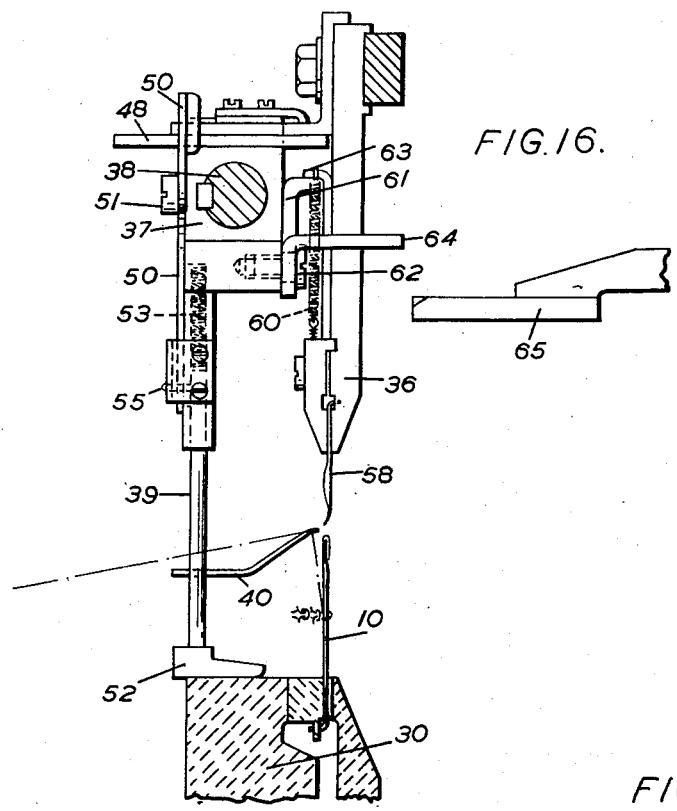
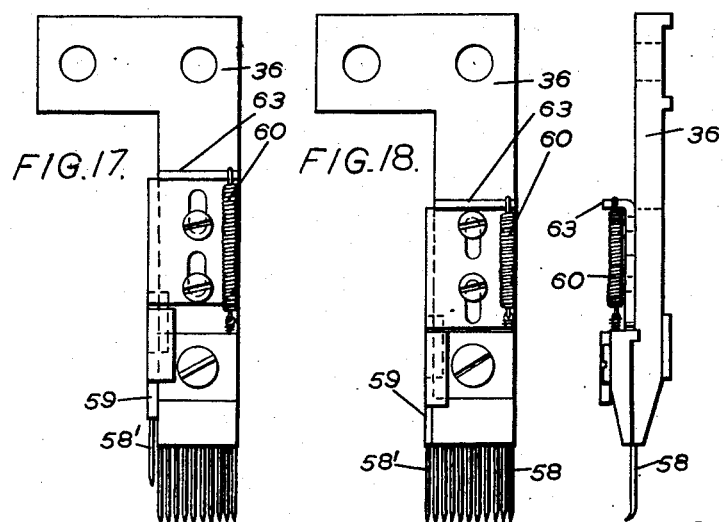
Inventor
Arthur Shortland
By

United States Patent Office 2,696,093
Patented Dec. 7, 1954

2,696,093

MACHINE AND METHOD OF JOINING ROWS OF LOOPS OF KNITTED FABRIC, AND PARTICULARLY OF CLOSING THE TOES AND HEELS OF FULL-FASHIONED STOCKING BLANKS

Arthur Shortland, Leicester, England, assignor to Mellor Bromley & Company Limited, Leicester, England Application February 6, 1951, Serial No. 209,641

Claims priority, application Great Britain February 8, 1950

17 Claims. (Cl. 66—82)

This invention concerns an improved method of joining courses (or other rows of loops) of knitted fabric and it is particularly concerned with a method of closing the toes and heels of stocking blanks which may be carried into effect on a Cottons' Patent or other straight bar knitting machine. The invention is not limited in this respect however for it will be apparent from the ensuing description that it may be carried into effect on other machines.

Normally the end of the toe of a full fashioned stocking blank is closed by a linking operation carried out on a linking machine. Similarly the connection of the end courses of the two heel tabs of a full-fashioned stocking blank having a French foot or a foot resembling a French foot is also carried out on a linking machine. This involves running the fabric onto a point bar or to the points of the linking machine itself, and a specific object of this invention is to obviate running-on and to render the use of a linking machine unnecessary, in the operations just discussed.

The invention provides a method of joining, on a machine having loop-holding instruments, edges of knitted fabric each of which edges consists of a group of formed loops, which comprises disposing the groups of loops on the instruments, and progressively joining loops of the groups, each to each, by knitting. The expression "disposing" is to be interpreted broadly as including forming the loops on the instruments (when the instruments are needles of a knitting machine), and transferring the formed loops to the instruments. Preferably the groups to be joined loop to loop are disposed end to end and this disposition is maintained throughout the joining operations by repeated transfers, of at least one group, from instrument to instrument.

The invention also provides a method of joining, on a knitting machine, the edges of two areas of knitted fabric each of which consists of a group of loops, which comprises disposing the two groups end to end on needles of the machine, and progressively joining the innermost loops by knitting and casting off at the juncture while maintaining the diminishing groups end to end at the juncture by progressive inward transfers of the loops of at least one group. It is to be understood that the loops of one or each group may be course-wise loops or wale-wise loops; by a group of course-wise loops there is meant a group of loops which extend along a course of knitting. These loops may be needle loops or sinker loops and if the loops of the two groups are course-wise loops, they may belong to one and the same course or they may belong to different courses of knitting. Therefore it will be appreciated that the method provided by this invention may be employed for joining the two parts of the same course together, as for example in closing the toe of a stocking blank, and for joining courses of two separate pieces of fabric together as for example in joining the terminal courses of heel tabs; it may further be employed for joining the groups of selvedge loops or other wale-wise loops, and for joining a group of course-wise loops to a group of wale-wise loops.

The juncture above-mentioned is the region at which the two groups are, for the time being, end to end; thus if only one of the groups is transferred inwardly the juncture is shifted along the needle line at each transfer.

In one embodiment of the invention the knitted join is produced by passing loops of at least one of the groups through loops of the other group. In an alternative the knitted join is effected by feeding a joining thread to at least one needle at the juncture and knitting a chain of loops thereof through the loops of the two groups.

In some circumstances it may be preferable to transfer only one group of loops endwise, and in other circumstances it may be preferable to transfer both groups endwise as the production of the join proceeds. The transfer may be effected by the use of transfer points at least equal in number to the loops of the group with which they are associated.

If one group only is transferred endwise two alternative procedures are practicable. In one, an inward transfer is effected between successive knitting operations so that prior to each knitting operation the juncture needle carries an original loop and one transferred loop. In the other, two inward transfers are effected between successive knitting operations so that prior to each knitting operation the juncture needle carries an original loop and two transferred loops.

The transfer may be through one needle spacer (i. e. the transferred group being shifted inwards by one needle at each transfer), or if a stronger join is required the transfer may be through two or more needle spaces.

The invention further provides knitted fabric, or an article composed thereof, having the edges of two areas, each of which edges consists of a group of loops, joined together by a chain-like formation of interknitted loops of the two groups. The invention further provides a knitted fabric or an article composed thereof having the edges of two areas, each of which edges consists of a group of loops, joined together by a knitted chain of loops.

The invention further includes a knitting machine constructed and arranged to carry out the method herein specified.

In order that the invention may be better understood various methods according to the invention, and the machine, will now be described in detail as examples with reference to the accompanying drawings in which Figures 1 and 2 show two alternative toe closures according to this invention;

Figures 3–7 are diagrams illustrating methods of joining according to this invention;

Figures 5A and 7A show the loop structure of the joins according to Figures 5 and 7 respectively;

Figures 8 and 9 illustrate a method of heel closing;

Figures 10 and 11 illustrate a further method of heel closing;

Figure 12 illustrates a still further method of heel closing;

Figure 13 is a diagram illustrating a further method of joining according to this invention, and Figure 13A shows the loop structure at the join;

Figure 14 is a perspective view showing the principal parts of a machine according to this invention;

Figure 15 is a front elevation and Figure 16 is a sectional elevation of parts of that machine;

Figures 17 and 18 are front elevations and Figure 19 is a side elevation of transfer points employed in the machine.

In the accompanying diagrams, various symbols are used, as follows:

A dot 10 represents a needle without a loop.

A circle 13 represents a needle with a normal loop.

A black circle 14 represents a needle holding two loops.

A black square 15 represents a needle holding three loops.

A cross 16 represents a loop of joining thread.

A circle with a cross in it 17 represents a cast-off double loop.

A square with a cross in it 18 represents a cast-off triple loop.

A circle bisected by a diagonal line 19 represents a cast-off single loop.

The arrows indicate the direction of transfer.

Successive horizontal rows of the symbols (working from the top downwards) are denoted by reference letters A, B, C, etc., and represent successive stages in the formation of the join.

Example I

This method is illustrated in Figure 3 and may be employed for closing the toe of a fully fashioned stocking blank. At the stage whereat the blank depends, at the toe, from the needles of the machine (on which at least the foot of the blank has been knitted) by its last-knitted course of loops, it is required to connect a group of loops consisting of one half of these loops to a group consisting of the other half (row A). The first step is to transfer all the loops of one group (which for convenience will be considered as being the right hand group 12R) inwards by one needle space by the use of transfer points at least equal in number to the loops in said group. Thus, at the juncture between the two groups (12R, 12L) there is one needle 10a which carries the original loop of the left hand group and a transferred loop as shown by the black circle 14 in row B. A joining thread is now fed, like a warp thread, to the juncture needle 10a and by appropriate knitting motions of the machine a loop of the joining thread is passed through the two loops and the latter are cast off. (Thus in row C there is a cross 16 representing the loop of joining thread, and below it there is the crossed circle 17 representing the cast-off double loop.) This involves preventing all the needles except the juncture needle from pressing, and providing this juncture needle with its own presser. Next the loops of the left hand group 12L are transferred to the right by one needle space so that the juncture needle now carries that loop of joining thread which remained on it after the last knitting operation, and the loop just transferred to it (see the black circle 14 in row D). The joining thread is now fed to the juncture needle and by appropriate motions a loop of the joining thread is passed through the two loops on the juncture needle and these two loops are cast off (row E). These operations continue as exemplified in rows E, F, G, so that the two groups of loops are connected by a warp chain of knitted loops formed of the joining thread. This warp chain is represented by the vertical row of crossed circles below the final row Z.

Example II

In an alternative illustrated in Figure 4, instead of transferring the groups alternately as just described, the transfer operations may be effected on one group only. For example, assuming this group to be the right hand group 12R as shown then, after each knitting operation, the entire group 12R (and at alternate transfer operations the loop remaining on the previous juncture needle) is transferred by one needle space to the left so that the juncture needle 10a in each operation is succeeded at an interval of two transfer operations by the needle next to the left.

Example III

Instead of producing the join by passing loops of a joining thread through loops of the two groups, the loops of the two groups 12R, 12L may be knitted directly together if the two groups are transferred alternately. This is illustrated in Figures 5 and 5A; after each inward transfer the juncture needle 10a holds an original loop and a newly-transferred loop (see the black circle in row B) and is manipulated to pass the latter through the former and to cast the former off, so that the newly-transferred loop remains on the juncture needle to become an "original" loop as represented by a circle in row C (the cast-off single loop being represented by a bisected circle 19). The structure of the join is clearly shown in Figure 5A. The general line of the join is indicated at 11 and the course which is folded on itself and joined loop to loop is indicated at 12; it will be seen that a loop 12*l* from the left hand half of this course is drawn through a loop 12*r* from the right hand half and then has the next loop 12*r'* of the right hand half drawn through it.

Example IV

If applied to closing the toe of a stocking blank each of the examples already described results in the seam extending centrally of the top of the toe, around the end of the toe, and centrally along the bottom of the toe for a short distance. This is clearly illustrated in Figure 1, in which the toe closure is indicated at 11a. As will readily be appreciated it is preferred in a full fashioned stocking to have the toe join extending horizontally along the end of the toe as shown at 11' in Figure 2, and the method of joining which will now be described as Example IV (Figure 6) is arranged to give this result. In describing this method it is convenient to consider the toe loops on the needles as consisting of three groups: a central group consisting of half the loops and a right hand and a left hand group each consisting of a quarter of the loops. For the production of the join, similar operations are simultaneously carried out on the right and left hand groups and so it is only necessary to describe and illustrate those carried out on the right hand group. Thus in row A of Figure 6 half the central group is embraced under bracket 12C and the right hand group is embraced under bracket 12R.

The first operation is to transfer the right hand group 12R inwards by one needle space so that a juncture needle 10a carries an original loop of the central group 12C and a transferred loop of the right hand group 12R as indicated by the black circle 14 in row B. A joining thread is fed to the juncture needle 10a and is passed by it through its two loops which are then cast off (crossed circle 17 row C). At this stage the needle which so far has been the juncture needle now carries a loop of the joining thread (cross 16). This loop together with all the remaining loops of the right hand group 12R are now transferred inwards by one needle space so that the new juncture needle is one needle inwards of the previous juncture needle and carries an original loop of the centre group 12C and the transferred loop of the joining thread (see the black circle 14 in row D). The transfer points are now back-racked, or racked out, one needle space and the loops of the right hand group 12R are transferred inwards by one needle so that the juncture needle now has the innermost loop of the right hand group applied to it and therefore carries three loops as indicated by the black square 15 in row E. The joining thread is fed to it and it is operated to pass a loop of the joining thread through the three loops and to cast them off as indicated by the crossed square 18 on row F. These operations are repeated for the requisite number of times. Like operations are effected on the left hand group, employing a further set of points. The machine therefore has two feeders for the two joining threads, mechanism for giving these feeders appropriate motions in supplying their threads to the joining needles and for shifting them inwards in accordance with the shift of the joining needles, individual pressers for the joining needles operable while all the other needles are prevented from pressing, the two sets of points, mechanism for imparting co-operating transfer motions to the needles and the points, and mechanism for racking the points inwards and outwards.

Example V

This example, illustrated in Figs. 7 and 7A resembles Example IV in that after the first inward transfer and knitting operation, row C, the loop 16 of the joining thread 20 and the remaining loops of the right hand group 12R are transferred inwards as before, but instead of the points being racked out and the right hand group again transferred inwards the joining thread 20 is fed to the juncture needle at this stage and a loop of it is passed through the two loops held on that juncture needle (viz. an original loop of the centre group and a transferred loop of joining thread as represented by the black circle 14 on row D). These two loops are cast off (17 row E), the points are racked out one needle space and the remaining loops of the right hand group are transferred inwards by one needle so that the same juncture needle now carries the previously formed loop of joining thread and the newly-transferred innermost loop of the right hand group (14 row F). The joining thread 20 is fed to this needle which is operated to pass a loop 16 of the joining thread through these two loops and to cast them off. At the next operation the just-formed loop of joining thread and of the loops of the right hand group are transferred inwards by one needle so that the new juncture needle carries an original loop of the centre group and a transferred loop of joining thread (black circle 14 row H). The joining thread is fed to this juncture needle and knitted.

These operations continue and it will be appreciated that each needle in turn acts as a juncture needle for two knitting operations.

The application of the methods of Examples I–V to the closing of the end of the heel will now be described.

Example VI

In one method of heel closing (illustrated in Figs. 8 and 9 and conveniently carried out on a heeling machine which knits the heel tabs 21R, 21L on to the last course 22R, 22L, of the high heel splicing 23R, 23L and simultaneously joins the initial course of the foot bottom 26 to the inner selvedge edges 24R, 24L of the heel tabs) the loops (25R, 25L) of the initial course of each side of the foot bottom and of the terminal courses 22R, 22L, of each high heel splicing are run to the needles 10 of the heeling machine in such manner that the high heel splicing courses 22R, 22L are located endwise between the foot bottom courses 25R, 25L, Fig. 8. As each heel tab 21R, 21L is knitted its selvedge edge 24R, or 24L, is united to the loops 25R or 25L in known manner and the inner selvedge edges 27R, 27L of the tabs are fashioned, so that they gradually diverge and when the heel tabs have been completed the two groups of loops 28R, 28L each consisting of a slack course knitted onto the last course of each tab are widely spaced apart. Therefore as a preliminary to joining these two groups of loops 28R, 28L together they are transferred inwards until they are located end to end as shown in Fig. 9. They are then connected as already described in any of the previous examples, loops 28R, 28L, corresponding (for example) to the groups of loops 12R, 12L previously mentioned.

Example VII

In another example, Figs. 10 and 11, the stocking blank is run on to the needles 10 of the heeling machine in such manner that the initial courses of the foot bottom lie between the terminal courses 22R, 22L of the two high heel splicings 23R, 23L. As the heel tabs 21R, 21L are knitted the outside edges 27R, 27L of the latter are fashioned and their inside edges 24R, 24L remain straight and are connected in known manner to the initial courses of the foot bottom. When the heel tabs have been completed the two groups of slack loops, 28R, 28L, in which they terminate are even more widely spaced apart than in the previous example and again the first operation is to transfer them inwards until they are located end to end as shown in Fig. 11. Thereafter they are joined together as already described.

Example VIII

In a further example, Fig. 12, the stocking blank is run on to the needles 10 of the heeling machine as described in the last example but during the knitting of the heel tabs the inner margins of these tabs are connected to the initial courses 25R, 25L of the foot bottom by inward transfer to the needles holding the foot bottom loops, the direction of transfer being indicated by the arrows. As a result when the heel tabs are completed the two groups of slack loops in which they terminate are either already end to end or are only slightly spaced apart so that the inward transfer preparatory to joining these groups of loops in the manner already described is obviated or minimised.

Example IX

In the example illustrated in Figs. 13 and 13A, the two groups of loops (such as 12R, 12L or 28R, 28L) are disposed end to end, and one group is then transferred inwards by one needle spaced (by the use of points) so that the juncture needle now has two loops 14 row B. There now starts a repeating sequence of operations. The joining thread 20 is looped under (behind) the beard of the juncture needle, and the points now descend for a further transfer. As they engage the needles, the innermost point closes the beard of the juncture needle, thereby imprisoning the loop of joining thread. As the transfer position is reached the two loops 14 (i. e. the transferred loop of one group and the original loop of the other group) on the juncture needle are cast off (as indicated at 17 row C) over the loop of joining thread by raising the inner transfer point. The other points then rise and transfer their loops one needle inward so that the juncture needle now holds a loop of joining thread and a transferred loop as indicated at 14 row C. The points are racked one needle space and a further inward transfer, through one needle-space, is effected. At this stage, the new juncture needle (the needle next inside the previous juncture needle) holds three loops viz: the original loop, a transferred loop of joining thread, and a transferred loop of the other group as indicated at 15 row D. The joining thread 20 is now looped under the beard of the new juncture needle and the sequence of operations is repeated.

It will be appreciated that in this example, a transfer point is movable separately from the other points and is used as a presser on the juncture needle and this feature may be applied to the other examples.

Turning now to the mechanism of the machine, the carrier, or each of them for the joining thread may be supported (to swing across the needle line) on a horizontal rod mounted on the narrowing machine. Thus this rod may be of circular cross section, carrying two slidable and rocking blocks from each of which a joining thread guide or carrier (like a thread guide in a warp knitting machine) depends. The two blocks are urged apart by a compression spring and are shifted inwards by engagement with parts associated with the two groups of points. They are rocked by any suitable mechanism to cause the guides to swing across the needle line; for example the descent of the inner (presser) points of Example IX may cause them to swing to the front of the needle line and the ascent of the inner points may cause them to swing to the beard side of the needle line.

In Figures 14–19 the needle bar is indicated at 30, the main cam shaft at 31, and the narrowing machine at 32. This narrowing machine includes the narrowing screw 33 and box 34 and a finger rod 35 to which is attached a narrowing finger 36 of any suitable width. These parts are of conventional character and require no further description or illustration. Two looping units (right and left hand) for carrying out the movements herein described are fitted on the front of the narrowing machine 32. Since the two units are of similar character only the right hand unit is shown. This unit comprises a block 37 slidably mounted on a rock shaft 38 (itself mounted in the narrowing machine) and carrying a depending rod 39 to which the looping thread guide 40 for the joining yarn 20 is attached. The rock shaft 38 is rocked at appropriate intervals to swing the feeding end of the guide 40 to and fro across the needle line, by means of cam 41 on the main cam shaft 31 operating a truck lever 42 and connections 43. The truck 44 of the lever 42 is capable of being shogged by control mechanism 45 of conventional character so that the rod 38 may be rocked as and when required under the control of an appropriate patterning device. The block 37 is urged towards the outer end of the division of needles by a compression spring 46 but is connected to the associated narrowing finger 36 by a wedge 48 on the latter which is interposed between a cam 49 on the block 37 and a lever 50 pivoted to the block at 51. Thus the guide 40 is shogged with the narrowing finger 36.

The rod 39 is provided at its lower end with a foot 52 arranged to be engaged by the top of the needle bar 30 so that the rod may be moved upwards in the body 37 against the action of spring 53 for the purpose of ensuring that the feeder 40 is kept clear of the heads of the needles. Lever 50 has a catch 54 on its lower end which by co-operating with a pin 55 on the rod 39 serves to latch the latter in an intermediate position. The pin 55 moves in a track defined between cam plates 56, 57 so that as rod 39 rises and falls it is partly rotated; this causes the guide 40 to make a wrapping motion.

The narrowing finger 36 contains points 58 of a conventional character: the end point 58' which is intended to co-operate with the juncture needle is carried on a slide 59 movable vertically on the finger 36 against the action of spring 60. This vertical movement of point 58' is for the purpose of causing it to relinquish its loop and is effected at the required time by means of lever 61 pivoted on block 37 at 62, and having one end arranged to engage under a lip 63 of the slide 59 and having another end 64 placed to be engaged by a striker plate 65. The latter is carried by levers such as 66 at least one of which is provided with a truck 67 operable by a cam 68 on the main shaft 31, the truck 67 being shogged by conventional mechanism 69 operated as and when required from a patterning device.

When in operation for the purpose of making a join according to the invention the machine is continuously in the fashioning position. The first movement is for the points 58 to descend by operation of the narrowing machine 32 and to transfer a group of loops one needle inwards so that the juncture needle holds two loops. This group may comprise any number of loops for the finger 36 can be of any desired width and if necessary broad and narrow fingers may be employed in conjunction with one another. As the points 58 rise after completing the transfer, shaft 38 is rocked in one direction so that the looping guide 40 passes a bar of yarn 20 across the needle line, from front to back alongside the juncture needle 10a. This rocking movement carries cam 49 along wedge 48, so that the block 37 and the guide 40 are shifted sideways towards the centre of the division of needles until lever 50 pressing against the other flank of wedge 49, is rocked to release pin 55. The rod 39 and the guide 40 thus descend, causing the yarn 20 to be carried below the beard of the juncture needle. In this descent pin 55 co-operates with cams 56, 57 causing the rod 39 to rotate so that the guide 40 carries a bar of yarn across the junction needle below its beard. Shaft 38 is then rocked in the opposite direction, carrying the guide 40 to the front side of the machine needles 10.

At the same time, the points 58 at needles 10 are descending for another transfer movement and the points 58 engage the needles (the looping guide 40 being out of the way, at the point of the needle line). The points 58 then descend and as they reach the transfer position (at which they are sufficiently high to permit of their being racked) plate 65 swings forward so that it is struck by the end 64 of the rising lever 61, thereby rocking the latter so that point 58' is raised to cast off the loops thereon. The transfer is completed so that the juncture needle then holds the loop of the joining thread and a transferred loop, and the points 58 are racked outwards one needle space. Next, a normal inward transfer is made (without the point 58' being given its independent movement) so that the juncture needle now holds a loop of the joining thread and two transferred loops. As the points rise, the shaft 38 is racked to commence a fresh sequence of looping combined with casting off and transferring.

The foregoing examples have particular relation to straight bar knitting machines, but the exercise of the invention on flat or circular knitting machines will present no difficulty to those skilled in the art. It is within the scope of the invention to construct a machine having loop-holding instruments whereof only the juncture instrument (or each of them) is a knitting needle, and such needle may be a latch needle. These instruments need not be arranged in a line, either curved or straight, but they may be arranged in a V at least one instrument at the apex being a juncture instrument.

What I claim is:

1. A method of joining, on a machine having loop-holding instruments, edges of knitted fabric each of which edges consists of a group of formed loops, which comprises disposing the loops on the instruments, and progressively joining loops of the groups, each to each, by knitting each join being knitted on one instrument only.

2. A method according to claim 1 wherein the groups to be joined are disposed end to end and this disposition is maintained throughout the joining operations by repeated transfers of at least one group from instrument to instrument.

3. A method of joining, on a knitting machine, the edges of two areas of knitted fabric each of which consists of a group of loops, which comprises disposing the two groups end to end on needles of the machine, and progressively joining the innermost loops by knitting and casting off on one needle only at the juncture while maintaining the diminishing groups end to end at the juncture by progressive inward transfers of the loops of at least one group.

4. A method according to claim 1 wherein the loops of the two groups are course-wise groups.

5. A method according to claim 4 wherein the two groups of loops belong to one and the same course.

6. A method according to claim 1, when employed for closing the toe of a stocking blank.

7. A method of joining, on a machine having loop-holding instruments, the terminal edges of a course-wise group of formed loops, which comprises disposing two groups of loops on the instruments and progressively joining loops of the two groups, each to each, by knitting at the juncture on one instrument only.

8. A method according to claim 1 in which the knitted join is produced by passing loops of at least one of the groups through loops of the other group.

9. A method according to claim 3 wherein the knitted join is effected by feeding a joining thread to a single joining needle at the juncture and knitting a chain of loops thereof through the loops of the two groups.

10. A method of joining, on a machine having loop-holding instruments, edges of knitted fabric each of which edges consists of a group of formed loops, which comprises disposing the groups of loops end to end on the instruments, progressively joining loops at the adjacent ends of the two groups to one another by knitting on one instrument only at the juncture, and maintaining the end to end disposition of the groups throughout the joining operation by repeated transfers of one group from instrument to instrument.

11. A method of joining, on a machine having loop-holding instruments, edges of knitted fabric each of which edges consists of a group of formed loops, which comprises disposing the groups of loops end to end on the instruments, progressively joining loops at the adjacent ends of the two groups to one another by knitting on one instrument only at the juncture, and maintaining the end to end disposition of the groups throughout the joining operation by repeated transfers of two groups from instrument to instrument.

12. A method according to claim 3, in which an inward transfer is effected between successive knitting operations so that prior to each knitting operation the juncture needle carries an original loop and one transferred loop.

13. A method according to claim 3, in which two inward transfers are effected between successive knitting operations so that prior to each knitting operation the juncture needle carries an original loop and two transferred loops.

14. A knitting machine, having loop-holding instruments for holding loops at the edges of knitted fabric, and means for joining loops of the groups, each to each, by knitting at each join on a single loop-holding instrument.

15. A knitting machine, having instruments for holding two groups of loops at the edges of two areas of knitted fabric, means for progressively joining the innermost loops of the respective groups by knitting and casting off at the juncture the loops held by a single instrument, and transfer mechanism for maintaining the diminishing groups end to end at the juncture by progressive transfers of the loops of at least one group towards the other group.

16. A machine according to claim 14 having means for feeding a warp thread to the juncture instrument at which the two groups are end to end, said instrument being a needle, and means for causing the juncture needle to knit the warp thread.

17. A machine according to claim 16 wherein the transfer mechanism comprises a group of points for taking and transferring loops to adjacent instruments, and a point at the end of the point group for casting off loops from the juncture needle.

References Cited in the file of this patent

UNITED STATES PATENTS

| Number | Name | Date |
|---|---|---|
| 2,276,906 | Sachsenmaier | Mar. 17, 1942 |
| 2,296,301 | Weisbecker | Sept. 22, 1942 |
| 2,319,768 | Beers | May 18, 1943 |
| 2,319,769 | Beers | May 18, 1943 |
| 2,319,771 | Beers | May 18, 1943 |
| 2,319,772 | Beers | May 18, 1943 |
| 2,366,340 | Lambach | Jan. 2, 1945 |